United States Patent Office 2,774,739
Patented Dec. 18, 1956

2,774,739

METHOD OF MAKING AN ELECTROLUMI-NESCENT PHOSPHOR

Keith H. Butler, Marblehead, and Richard M. Rulon, Salem, Mass., assignors to Sylvania Electric Products, Inc., Salem, Mass., a corporation of Massachusetts No Drawing. Application July 22, 1952,
Serial No. 300,358

2 Claims. (Cl. 252—301.6)

This invention relates to electroluminescent phosphors and to methods of manufacture thereof.

Certain phosphors of this type are shown in a copending application Serial No. 230,711, filed June 8, 1951, by Keith H. Butler. Zinc sulphide activated with copper, and with manganese in addition if desired, and containing a small quantity of lead, is especially effective as such a phosphor.

We have discovered that a phosphor such as a copper-activated zinc sulphide type phosphor, which will respond to ultraviolet or cathode ray excitation but which will not electroluminesce, can be made electroluminescent by the addition of a substance such as lead. Such a phosphor can be made in two stages, that is, by adding the copper and firing, then adding lead and refiring. A phosphor which has too little lead initially, can be improved in brightness of light emission by the addition of more lead and refiring.

The phosphors described above will generally have a blue or green emission but the addition of manganese, either concurrently with the lead or copper, or afterward, will change the emission color to yellow.

We have discovered that an amount of lead in the final phosphor above a lower limit of about 0.0002% by weight of the zinc sulphide provides good electroluminescence, but if the amount is above about 0.02%, the luminescence will decrease.

The lead can be added to the copper-activated zinc sulfide in three ways: either (1) dry, that is, as a lead salt which will break down to give the oxide on firing; or (2) wet, that is, by suspending the phosphor in water, adding the lead as a soluble salt (for example as lead acetate) and then runing in a stream of $H_2S$ for a few minutes to precipitate lead sulfide, after which the mixture is filtered and dried before refiring; or (3) moist, by wetting the phosphor with a solution of a lead salt, such as the nitrate or acetate, and then drying the moistened material before refiring.

The amount of lead added to the mixture before firing will generally need to be between about 0.0002 to about 0.0012 mole per mole of zinc sulfide, although the exact amount necessary will vary with the firing conditions, because the usual lead salts are volatile and there will be considerable loss during firing.

The effect of our lead treatment on a green phosphor is shown in Table I, the phosphor before treatment containing some lead but not enough for good brightness, and being a zinc sulfide activated with about 0.001 gram-atom of copper for each mole of zinc sulfide.

Table I

|  | Before Treatment | | After Treatment | |
| --- | --- | --- | --- | --- |
|  | Light Output | Current (Microamps.) | Light Output | Current (Microamps.) |
| With no ZnO | 180 | 120 | 160 | 160 |
| With ZnO | 180 | 120 | 530 | 120 |

The untreated green-emitting phosphor of the above table had been washed in acetic acid, and had a fairly good light output even before treatment. The addition of about 5% zinc oxide enhanced the effect of the lead, of which 0.001 mole were added in the form of lead carbonate for each mole of zinc sulfide in a dry process, the resultant mixture being then fired at about 1720° F. for about three-quarters of an hour.

The effect of the wet method is shown in Table II below, where the zinc sulfide phosphor treated was a blue-electroluminescent phosphor originally containing some lead, but not sufficient for good brightness. The phosphor contained 0.0006 gram-atom of copper per mole of zinc sulfide. An example of a blue-emitting phosphor is shown in a copending application Serial No. 230,712, filed June 8, 1951, by Keith H. Butler and Horace H. Homer.

Table II

| Before Treatment | | After Treatment | |
| --- | --- | --- | --- |
| Light Output | Current (Microamps.) | Light Output | Current (Microamps.) |
| 80 | 55 | 220 | 65 |

In the case of the phosphor above, which had not been acid washed, it was found unnecessary to add zinc oxide in order to gain the benefit of the lead treatment, the reason being that the lack of acid washing of the untreated phosphor left some oxide in it. The amount of lead added was 0.0001 mole per mole of zinc sulfide before firing.

The equivalence of the wet and dry treatments is shown in Table III below for a yellow-emitting zinc sulfide phosphor, containing 0.001 gram-atom of copper and 0.005 gram-atom of manganese per mole of zinc sulfide, which is a phosphor of the type shown in Keith H. Butler's copending patent application Serial No. 230,711, filed June 8, 1951.

Table III

|  | Before Treatment | | After Treatment | |
| --- | --- | --- | --- | --- |
|  | Light Output | Current (Microamps.) | Light Output | Current (Microamps.) |
| Wet | 25 | 110 | 140 | 115 |
| Dry | 25 | 110 | 160 | 210 |

The amount of lead added in the above case was 0.00045 gram-atom per mole of zinc sulfide.

The above examples show the improvement that can be made in a poor phosphor by the addition of lead and refiring. Table IV below shows the improvement in a phosphor which was substantially non-luminescent before treatment.

Table IV

| Before Treatment | | After Treatment | |
| --- | --- | --- | --- |
| Light Output | Current (Microamps.) | Light Output | Current (Microamps.) |
| 2 | 40 | 460 | 80 |

This phosphor was made in two stages. In the first stage, a copper salt was added to a suitable quantity of zinc sulfide, as shown for example in copending application Serial No. 230,713, filed June 8, 1951, but the lead was omitted. The mixture was then fired for 40 minutes at a temperature of about 1720° F., in an essentially inert atmosphere, that is with nitrogen flowing across the mixture. Since the mixture was fired in a furnace which had previously been used with lead-containing mixtures, there may have been a very small amount of residual lead in the firing, so the phosphor gave a very faint electroluminescence.

The product resulting from the first firing was then treated with lead, by the addition of about 0.0004 mole lead carbonate for each mole of zinc sulfide, and refiring in the same sort of atmosphere at about 1720° F. The luminescence rose from 2 to 460 units, an increase of 230 times.

The above was for a green-emitting phophor. If after the lead is added and a green phosphor results, a manganese salt is added and the material refired, a yellow phosphor results. The amount of manganese added can be, for example, 0.02 mole for each mole of zinc sulfide. Phosphors containing more manganese than this will generally be dark in color and of lower luminescence, and phosphors containing less than 0.002 mole for each mole of zinc sulfide will have green or greenish-yellow emission.

Some lead should generally be added with the manganese, to make up for loss in lead during the manganese firing.

All the lead can be added with the manganese, if desired, instead of before the addition of the manganese, or the manganese can be added with the copper, and the lead added afterward. As a further variation of the process, the lead, or the lead and manganese, can be added first, and the copper added afterward.

As a specific example of the preparation of a phosphor, we have mixed the following ingredients as fine powders in the proportions shown:

|  | Grams |
|---|---|
| ZnO | 80 |
| ZnS | 900 |
| CuO | 0.8 |

This mixture was then fired for about 40 minutes at about 1720° F. in a furnace with nitrogen flowing continuously over the mixture to provide an inert atmosphere as described in a copending patent application, Serial No. 230,711, filed June 8, 1951, by Keith H. Butler.

The material after firing was substantially non-electroluminescent without further treatment. 5.3 grams of lead carbonate were then added to the material as a fine powder and intimately mixed with it, after which the resultant mixture was again fired for 40 minutes at about 1720° F. with nitrogen flowing over the mixture to provide an inert atmosphere. The resultant material then electroluminesces strongly. While this firing method gives excellent results, other firing methods such as batch firing in a nitrogen atmosphere or even firing in a covered crucible in air may also be used in the production of these phosphors.

The light output is given in the tables in arbitrary units proportional to the brightness.

The method of lead treatment described herein is useful in various zinc sulfide type phosphors, that is phosphors having zinc or cadmium, or both, as the cations and sulfide or solenide, or both, as the anion.

The firing temperature for the lead treatment can vary from 1400° F. to 1900° F., although I prefer temperatures in the neighborhood of about 1720° F. In the final phosphor, the amount of lead can vary from about 0.0002 to 0.02% by weight, which is equivalent to 0.000001 to .0001 gram-atom per mole of zinc sulfide.

The amount of copper can vary from about 0.0004 to about 0.0015 gram-atom per mole of sulfide, and the manganese from zero to 0.025 moles on the same basis.

The lead, copper and manganese activators may be added in any suitable compound such as, for example, the carbonates, oxides, acetates, nitrates, and sulfates.

What we claim is:

1. The method of making an electroluminescent phosphor which comprises: firing a mixture of zinc sulfide with between about 0.0004 to about 0.0015 gram atom of copper for each mole of zinc sulfide; then mixing the resultant material with between about 0.0002 and about 0.0012 gram atom of lead per mole of zinc sulfide and a small amount of zinc oxide, and firing the mixture.

2. The method of making an electroluminescent phosphor which comprises: firing a mixture of zinc sulfide with between about 0.0004 to about 0.0015 gram atom of copper for each mole of zinc sulfide; then mixing the resultant material with between about 0.0002 and about 0.0012 gram atom of lead per mole of zinc sulfide and about 5% of zinc oxide and firing the mixture.

References Cited in the file of this patent

UNITED STATES PATENTS

| 2,447,322 | Fonda | Aug. 17, 1948 |
| 2,504,674 | Fonda | Apr. 18, 1950 |
| 2,624,857 | Mager | Jan. 6, 1953 |
| 2,745,811 | Butler | May 15, 1956 |

FOREIGN PATENTS

| 873,860 | France | July 22, 1942 |